United States Patent [19]
Kimura

[11] Patent Number: 5,928,793
[45] Date of Patent: Jul. 27, 1999

[54] LAMINATED GLASS FOR VEHICLES

[75] Inventor: Masanobu Kimura, Osaka, Japan

[73] Assignee: Nippon Sheet Glass Co., Ltd., Osaka, Japan

[21] Appl. No.: 09/085,114

[22] Filed: May 28, 1998

[30]     Foreign Application Priority Data

| Jun. 10, 1997 | [JP] | Japan | ................................. 9-152247 |
| Jun. 23, 1997 | [JP] | Japan | ................................. 9-165713 |
| Mar. 17, 1998 | [JP] | Japan | ................................ 10-067417 |

[51] Int. Cl.$^6$ ................................................. B32B 17/00
[52] U.S. Cl. ......................... 428/428; 428/432; 428/437; 428/410
[58] Field of Search .................... 428/428, 432, 428/437, 410; 501/68, 70

[56]         References Cited

U.S. PATENT DOCUMENTS

| 3,615,320 | 10/1971 | Junge et al. ............................ 65/30.14 |
| 3,790,430 | 2/1974 | Mochel .................................. 428/410 |
| 4,255,199 | 3/1981 | Reade ................................... 428/410 |
| 5,264,286 | 11/1993 | Ando ..................................... 428/432 |
| 5,277,946 | 1/1994 | Nagai et al. ............................ 428/426 |
| 5,773,148 | 6/1998 | Charrue ................................. 428/410 |

FOREIGN PATENT DOCUMENTS

| 10-001329 | 1/1998 | Japan . |
| 1 253 284 | 11/1971 | United Kingdom . |
| 2 011 316 | 7/1979 | United Kingdom . |

*Primary Examiner*—Timothy M. Speer
*Attorney, Agent, or Firm*—Sughrue, Mion, Zinn, Macpeak & Seas, PLLC

[57]         ABSTRACT

A laminated glass for vehicles comprising at least two single glass sheets which are laminated through at least one interlayer, wherein an outermost single glass sheet in a laminate comprising at least two single glass sheets is an aluminosilicate glass containing lithia ($Li_2O$).

The laminated glass is suitable as the countermeasure of flying stones when applied to windows of vehicles. The aluminosilicate glass sheet is preferably obtained by a float method, and it is also preferably chemically tempered by ion exchange.

8 Claims, 2 Drawing Sheets

OUTSIDE

INSIDE 1   2   3

FIG. 1

OUTSIDE INSIDE 1  2  3

LAMINATED GLASS FOR VEHICLES

FIELD OF THE INVENTION

The present invention relates to a laminated glass for vehicles, which is used as window glasses for automobiles, railroad vehicles, etc.

BACKGROUND OF THE INVENTION

Glass sheets called safety glass sheets are used as front windshield glass sheets of vehicles. Safety glass generally includes a reinforced glass (tempered glass) and a laminated glass.

Tempered glass sheets are produced by, for example, heating glass sheets up to about their softening point, and blowing air to both surfaces of the glass sheet to rapidly quench the glass sheet, thereby forming a compression stress layer on the surfaces of the glass sheet. Glass is generally resistant to compression. Therefore, a glass sheet having strength of several times that of a glass sheet which is not thus treated is obtained by the presence of such a compression stress layer.

On the other hand, a method of reinforcing a glass includes a chemically tempering method by a so-called ion exchange method, in addition to the above-described tempering.

As a chemically tempered glass suitable for windshields of automobiles, airplanes, etc., Japanese Patent Publication No. 47-1312 discloses lithium or sodium aluminosilicate glass sheets and a method for producing the same. This Publication describes on page 3, right column, lines 29 to 34 that an especially preferred glass composition comprises 2–6% $Li_2O$, 5–10% $Na_2O$, 15–25% $Al_2O_3$ and 60–70% $SiO_2$, in terms of % by weight of the respective oxide basis, with the sum of $Li_2O$, $Na_2O$, $Al_2O_3$ and $SiO_2$ being at least 95% by weight of the composition.

WO/94/08910 (PCT/FR93/01035) provides glass for windshields of aircraft, etc. A chemically tempered glass is shown therein as a countermeasure for flying objects (such as collision of flying birds). The chemically tempered glass has a composition comprising, in % by weight: 65.0–76.0% $SiO_2$, 1.5–5.0% $Al_2O_3$, 4.0–8.0% $MgO$, 0.0–4.5% $CaO$, 10.0–18.0% $Na_2O$, 1.0–7.5% $K_2O$, and 0.0–4.0% $B_2O_3$.

On the other hand, laminated glasses comprising, for example, two glass sheets which are laminated through an interlayer are widely used as front windshield glass sheets of automobiles, etc. Those laminated glasses are produced by, for example, laminating two glass sheets through a PVB (polyvinyl butyral) film.

The laminated glass of this type is an untempered sheet in that a plain stock glass sheet is not tempered. Therefore, even if the laminated glass is broken in accidents, it is broken into large pieces, so that a driver's visual field is not prevented. Soda-lime glass sheets formed by a float method are widely used as the plain stock glass sheet for such a laminated glass.

JP-A-54-100415 discloses a windshield laminated glass having an inner sheet of a chemically tempered silicate glass, wherein a glass sheet having a thickness of 1.5 mm or less produced by a Fourcault process is chemically tempered and is used as the inner sheet of the windshield laminated glass (The term "JP-A" used herein means an "unexamined Japanese patent application"). The object of the invention disclosed in JP-A-54-100415 is to reduce the damage to the head of drivers and fellow passengers in low-speed collisions. Specifically, JP-A-54-100415 provides a laminated glass having a severity index (SI) of 1,000 or less. Although its glass composition is not specifically disclosed therein, it is presumed that a glass sheet of the laminated glass will be an easily-producible soda-lime glass sheet in view of the facts that the glass sheet is a silicate glass sheet produced by a Fourcault process and the laminated glass is for windshield.

Vehicles running at high speed, such as railroad vehicles or automobiles, often fly up small stones and others existing around railways and roads due to the wind pressure during their running. If the thus flung-up stones and others (hereinafter referred to as "flying stones") smash into the running vehicles, the surface of the window glass of the vehicles will be scratched, and breakage of the window glass may occur at the worst.

Therefore, it is required to prevent as much as possible the window glass of vehicles from being scratched by those flying stones or the like to such a severe degree that the thus-scratched window glass must be exchanged for new one, and also from being broken.

It is considered as a means for solving the problem to use a tempered glass having compression stress formed on its surface as the window glass for vehicles in order to protect it from flying stones.

However, use of the tempered glass sheet has the problem that, if damaged, it is broken into small pieces to thereby interfere with the visual field of drivers and passenger crew. For this reason, zone tempered glass sheets have heretofore been used as front windshield glass sheets of automobiles, in which the degree of tempering is decreased in the part in front of drivers.

However, in Japan, the front windshield glass of passenger cars must be made of a laminated glass as ruled in the law. Therefore, a single sheet of tempered glass cannot be used as the front windshield glass of automobiles. For other automobiles except passenger cars, it is desirable to use a laminated glass as the front windshield glass for safety purposes.

Some examples are known of using tempered glass sheets or zone tempered glass sheets to produce a laminated glass for vehicles.

Where a laminated glass comprising tempered glass sheets are used in vehicles, it is believed that such a laminated glass will be effective to protect the surface thereof from scratches by flying stones and others due to that compression stress is formed on the surface. However, if the laminated glass is broken, the laminated glass is entirely broken in view of the properties of the tempered glass. The entire breakage of the laminated glass used as the windshield shall interferes with the visual field of drivers and passenger crew, and shall even make passengers and fellow passengers have an extreme fear.

Even if a zone tempered glass sheet is used, when it is broken it also interferes with the visual field of drivers and passenger crew even though the visual field when broken is improved to some degree.

In other words, where tempered glass sheets (including zone tempered glass sheets) are laminated to form a laminated glass and such is used in vehicles, the resulting laminated glass is, when broken, entirely broken to thereby make passengers and fellow passengers have an extreme fear, and such an entire breakage interferes with the visual field of drivers and passenger crew. For these reasons, it is disadvantageous to use such tempered glass sheets as a countermeasure for flying stones.

On the other hand, glass can also be tempered by a chemical tempering method by an ion exchange method as described above.

Soda-lime glass sheets formed by a float method are widely used as glass sheets for vehicles. It is general in the chemical tempering method of such soda-lime glass sheets by an ion exchange method to exchange $Na^+$ for $K^+$, because the soda-lime glass sheets contain a lot of Na ions.

However, even if soda-lime glass sheets are chemically tempered, the surface compression layer formed thereon has only a thickness as small as at most several tens of μm. Therefore, if chemically tempered soda-lime glass sheets are used in vehicles, the scratch resistance of such chemically tempered soda-lime glass sheet as the countermeasure of flying stones is merely equal to or is rather worse than that of a non-tempered plain stock glass sheet.

In addition, since the ionic radius of $K^+$ is relatively large, the ion exchange of $Na^+$ with $K^+$ takes a relatively long time. Therefore, this is unfavorable from an industrial viewpoint. The ionic radius of $Na^+$ is 0.099 nm, and that of $K^+$ is 0.138 nm.

The windshield glass disclosed in JP-A-54-100415 is one having a chemically tempered silicate glass sheet as the inner sheet. Therefore, if this is used as it is, it does not act as a countermeasure for flying stones. Further, even if a soda-lime glass sheet chemically tempered is used as the outer sheet, if such is a glass sheet produced in a Fourcault process, the resulting laminated glass still does not effectively act as a countermeasure for flying stones for the same reasons as described above.

The glass composition disclosed in Japanese Patent Publication No. 47-1312 requires high temperature to melt and mold it, and it is difficult to produce high-quality glass from such a glass composition by a float method.

WO/94/08910 requires a long time of at least 72 hours or longer, and preferably 10 days or longer, for the ion exchange, and this is not a practical production method in view of cost.

SUMMARY OF THE INVENTION

The present invention has been made to overcome the various problems in the prior art techniques.

Accordingly, an object of the present invention is to provide a laminated glass which is especially suitable for use in vehicles.

According to the present invention, there is provided a laminated glass for vehicles comprising at least two single glass sheets which are laminated through at least one interlayer, wherein an outermost single glass sheet in a laminate comprising at least two single glass sheets is an aluminosilicate glass containing lithia ($Li_2O$).

In the preferred embodiment, the outermost single glass sheet is chemically tempered by an ion exchange of Li ions with Na ions.

Also, in the preferred embodiment, the outermost single glass sheet is a glass sheet obtained by a float method.

BRIEF DESCRIPTION OF THE DRAWINGS

FIG. 2($a$) an ($b$) each show a pattern of shattering of the laminated glasses for vehicles.

DETAILED DESCRIPTION OF THE INVENTION

The term "outermost single glass sheet" used herein means a single glass sheet facing outside when the laminated glass is applied to windows or the like of vehicles.

In the laminated glass for vehicles according to the present invention, the outermost single glass sheet is preferably an aluminosilicate glass composition containing lithia comprising, in % by weight:
58 to 66% $SiO_2$;
13 to 19% $Al_2O_3$;
3 to 4.5% $Li_2O$;
6 to 13% $Na_2O$;
0 to 5% $K_2O$;
10 to 18% $R_2O$,
   wherein $R_2O=Li_2O+Na_2O+K_2O$;
0 to 3.5% MgO;
1 to 7% CaO;
0 to 2% SrO;
0 to 2% BaO;
2 to 10% RO,
   wherein RO=MgO+CaO+SrO+BaO;
0 to 2% $TiO_2$;
0 to 2% $CeO_2$;
0 to 2% $FeZO_3$; and
0 to 1% MnO;
   with the proviso that $TiO_2 + CeO_2 + Fe_2O_3 + MnO = 0.01$ to 3%.

The outermost single glass sheet is more preferably an aluminosilicate glass composition containing lithia comprising, in % by weight:
60 to 66% $SiO_2$;
15 to 18% $Al_2O_3$;
3 to 4.5% $Li_2O$;
7.5 to 12.5% $Na_2O$;
0 to 2% $K_2O$,
   with the proviso that $Li_2O+Na_2O+K_2O=11$ to 17%;
5 to 3% MgO;
2.5 to 6% CaO;
0 to 2% SrO;
0 to 2% BaO;
   with the proviso that MgO+CaO+SrO+BaO=3 to 9%;
0 to 2% $TiO_2$;
0 to 2% $CeO_2$;
0 to 2% $Fe_2O_3$; and
0 to 1% MnO,
   with the proviso that $TiO_2 + CeO_2 + Fe_2O_3 + MnO = 0.01$ to 3%.

In the laminated glass for vehicles of the present invention, a matrix glass composition of the outermost single glass sheet has a melting temperature (at which the composition has a viscosity of $10^2$ poises) of preferably 1,550° C. or less, more preferably 1,440° C. or less, a working temperature (at which the composition has a viscosity of $10^4$ poises) of preferably 1,100° C. or less, more preferably 1,055° C. or less, and a liquid-phase temperature lower than the working temperature.

The reasons for limiting each component of the lithia-containing aluminosilicate glass composition used in the present invention are explained below. Unless otherwise indicated, all percents are by weight.

$SiO_2$ is a main component to form a glass, and is the essential constituent component. If the content of $SiO_2$ is smaller than 58%, water resistance of glass is poor. On the other hand, if it is larger than 66%, the viscosity of the glass melt is too high, becoming difficult to melt and mold the glass composition.

Accordingly, the $SiO_2$ content is preferably 58 to 66%, and more preferably 60 to 66%.

$Al_2O_3$ is one of the important constituent components. $Al_2O_3$ acts to improve water resistance of glass. If the content of $Al_2O_3$ is smaller than 13%, $Al_2O_3$ does not exhibit its effect satisfactorily. On the other hand, if it is larger than 19%, the viscosity of glass melt is too high, becoming difficult to melt and mold the glass composition.

Accordingly, the $Al_2O_3$ content is preferably 13 to 19%, and more preferably 15 to 19%.

$Li_2O$ is a component to increase the melting property of the glass composition. This component is also an essential component for conducting ion exchange. If the $Li_2O$ content is smaller than 3%, the melting property is poor. Further, sufficient surface compression stress after ion-exchange is not obtained. On the other hand, if it is larger than 4.5%, the water resistance of glass is poor, and in addition, the liquid-phase temperature of the glass composition increases, becoming difficult to mold the glass composition.

Accordingly, the $Li_2O$ content is preferably 3 to 4.5%.

$Na_2O$ is a component to increase the melting property of glass composition. If the $Na_2O$ content is smaller than 6%, $Na_2O$ does not exhibit its effect satisfactorily. On the other hand, if it is larger than 13%, the water resistance of glass is poor.

Accordingly, the $Na_2O$ content is preferably 6 to 13%, and more preferably 7.5 to 12.5%.

$K_2O$ is a component to increase the melting property of glass composition, but is not an essential component. In an ion-exchanged glass, the surface compression stress may be decreased.

Accordingly, the $K_2O$ content is preferably 5% or smaller, and more preferably 2% or smaller.

If the sum of $Li_2O+Na_2O+K_2O$, which is represented by $R_2O$, is smaller than 9%, the viscosity of glass melt is too high, becoming difficult to melt and mold the glass composition. On the other hand, if it is larger than 18%, the water resistance of glass is poor.

Accordingly, the sum of $Li_2O+Na_2O+K_2O$, $R_2O$, is preferably 9 to 18%, and more preferably 10 to 17%.

MgO is a component to increase the melting property of the glass composition. However, if the MgO content is larger than 3.5%, the liquid-phase temperature of the glass composition increases, becoming difficult to mold the glass composition.

Accordingly, the MgO content is preferably 3.5% or smaller, and more preferably 0.5 to 3%.

CaO is a component to increase the melting property of glass composition, and is an essential component to control the ion-exchange speed in the ion-changed glass. If the CaO content is smaller than 1%, CaO does not exhibit its effect satisfactorily. On the other hand, if it is larger than 7%, the liquid-phase temperature of glass composition is elevated, becoming difficult to mold the composition.

Accordingly, the CaO content is preferably 1 to 7%, and more preferably 2.5 to 6%.

SrO and BaO are components to increase the melting property of glass composition, and are also components effective to lower the liquid-phase temperature of glass composition. However, those components increase the density of glass, and also increase the cost of raw materials.

Accordingly, the SrO content and the BaO content each should be preferably 2% or smaller, and more preferably 1% or smaller.

If the sum of MgO+CaO+SrO+BaO, which is represented by RO, is smaller than 2%, the viscosity of glass melt is too high, so that it is difficult to melt and mold the glass composition. On the other hand, if it is larger than 10%, the liquid-phase temperature of the glass composition is elevated, becoming difficult to mold the composition.

Accordingly, the sum of MgO+CaO+SrO+BaO, RO, is preferably 2 to 10%, and more preferably 3 to 9%.

$Fe_2O_3$ is that $Fe^{2+}$ and $Fe^{3+}$ exist in an equilibrium state in a glass melt, and these ions greatly affect light in transmittance of light, particularly transmittance of ultraviolet region, in the glass melt. If the total iron content in the glass melt is larger than 2% in terms of $Fe_2O_3$, the absorption in ultraviolet region is too large, so that it is impossible to control temperature distribution of the glass in melting and molding, resulting in deterioration of quality of glass.

Accordingly, the total iron content is preferably 2% or smaller in terms of $Fe_2O_3$.

$TiO_2$, $CeO_2$ and MnO each are components effective to change the equilibrium state of $Fe^{2+}$ and $Fe^{3+}$ and also to change the light transmittance by the interaction of them. However, if those components are contained in excess, the quality of glass deteriorates, and also the cost of raw materials is increased.

Accordingly, the $TiO_2$ content is preferably 3% or smaller, and more preferably 2% or smaller, the $CeO_2$ content is preferably 2% or smaller, and the MnO content is preferably 1% or smaller.

In addition to the above-described components, the glass composition may further contain colorants such as NiO, $Cr_2O_3$ or CoO, and clarifiers such as $SO_3$, $As_2O_3$ or $Sb_2O_3$, within the range of not impairing the characteristics of the present invention.

Of those additives, $SO_3$ is derived from a sulfate which is used as a clarifier. Where a sulfate is added to the glass composition as a clarifier, its clarifying effect is insufficient if the amount of $SO_3$ remaining in glass is smaller than 0.05%.

On the other hand, even if $SO_3$ remaining in glass is larger than 0.5%, its clarifying effect does not increase any more, but rather the amount of $SO_x$ existing in the exhaust gas to be discharged during the step of melting the glass composition increases, which is unfavorable for environmental protection.

Accordingly, $SO_3$ to remain in glass is preferably 0.05 to 0.5%.

Because of their toxicity, the clarifiers, $As_2O_3$ and $Sb_2O_3$ each are preferably not larger than 1%, and more preferably not larger than their amounts to be contaminated from impurities, that is, not larger than 0.1%.

Highly volatile $B_2O_3$, ZnO, $P_2O_5$, PbO and others are preferably not larger than their amounts to be contaminated from impurities, that is, not larger than 0.1%, since they corrode bricks of glass melting furnaces, and also the volatile components aggregate on ceilings of the furnaces and then fall down together with brick pieces into glass being melted to thereby worsen the quality of glass produced.

Viscosity of the glass is that the glass composition has a melting temperature (at which it has a viscosity of $10^2$ poises) of preferably 1,550° C. or less, and more preferably 1,540° C. or less, in order to obtain high-quality glass.

On the other hand, where glass is shaped into sheets having a high degree of surface smoothness, and especially where glass sheets are produced by a float method, it is preferable that the glass composition has a working temperature (at which it has a viscosity of $10^4$ poises) of 1,100° C. or less, and a liquid-phase temperature lower than the working temperature. It is more preferable that the glass composition has the working temperature of 1,055° C. or less, and the liquid-phase temperature lower than the working temperature.

The interlayer which can be used in the present invention is not particularly be limited, and the conventional interlayers used in the field of laminated glasses can be used. Polyvinyl butyral (PVB) film is more popular.

The laminated glass for vehicles according to the present invention can generally be produced by the following method.

An aluminosilicate glass sheet is provided. This glass sheet is laminated with another optional single glass sheet through an interlayer of PVB film such that the aluminosilicate glass sheet is arranged at the outermost surface.

Figure 1:
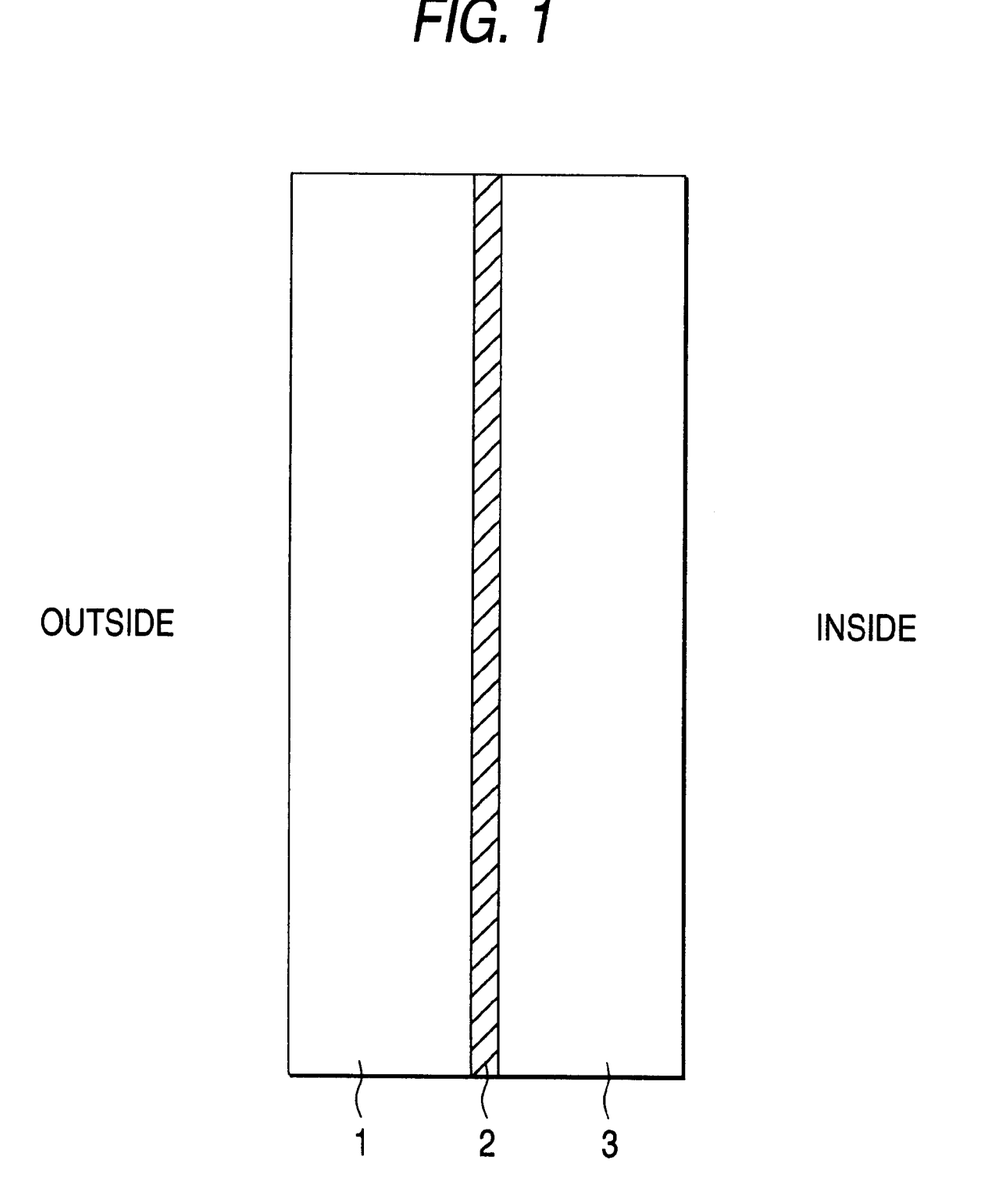
FIG. 1 is a cross sectional view showing one example of the constitution of the laminated glass according to the present invention.

FIG. 1 shows one example of the constitution of the laminated glass according to the present invention. 1 is a single glass sheet of aluminosilicate glass disposed outside, 2 is an interlayer, and 3 is another single glass sheet disposed inside. The alminosilicate single glass sheet 1 is laminated with the another single glass sheet 2 through the interlayer 2.

If desired and necessary, three or more single glass sheets can be laminated through the respective interlayer to form a laminated glass so long as the aluminosilicate glass sheet is arranged at the outermost surface.

The aluminosilicate glass sheet is preferably produced by a float method. In such a float method, a glass melt is sent on a tin molten bath, spread thereon, and molded into a glass sheet. As a result, an internal stress of the glass is well released. From this fact, as compared with other production processes this float method has the characteristic that cracks scarcely cause in the glass sheet obtained by this method even by shock or the like.

Further, the glass composition preferably has the specific compositions as described hereinabove, and also the specific melting temperature and working temperature as described hereinabove in order to produce a glass sheet by the float method.

In the laminated glass of the present invention, each single glass sheet constituting the laminated glass may be subjected to a bending processing.

One preferred embodiment of the present invention is that the outermost single glass sheet is chemically tempered by an ion exchange of Li ions with Na ions.

The ion exchange treatment of the glass sheet is conducted by diffusion exchange between $Li^+$ and $Na^+$. Since the ionic radius of $Li^+$ is small to be 0.059 nm, the ion exchange between $Li^+$ and $Na^+$ takes a shorter time than that between $K+$ and $Na^+$. In addition, it is possible to increase the sodium ion exchange depth in the glass sheet. Therefore, the laminated glass sheet of the present invention is characterized in that the constituent glass sheets have a satisfactorily large ion exchange depth and have a sufficient surface compression stress.

The single glass sheet thus chemically tempered has a Na ion exchange depth of 180 $\mu$m or more, and a surface compression stress of 2,000 $kg/cm^2$ or more. If the chemically tempered glass sheet which is the outermost glass sheet in a laminated glass has such ion exchange depth and surface compression stress, the resulting laminated glass exhibits sufficient effect as a countermeasure for flying stones, when used in vehicles.

It is sufficient for the Na ion exchange depth to be 180 $\mu$m or more. The upper limit of the depth is not particularly be limited, but is generally determined by various factors. For example, the ion exchange depth is basically determined by a function of a temperature of molten salt and a dipping time. The ion exchange depth can be increased if temperature is increased as high as possible and/or ion exchange time is prolonged as long as possible, at a temperature within the range that a glass does not deform.

However, where ion exchange is conducted in, for example, a molten salt at 380° C., it requires a time of at least 2 days if it is intended to obtain an ion depth exceeding 400 $\mu$m. Further, even if it is intended to obtain an ion exchange depth exceeding 300 $\mu$m, it requires a time of at least 1 day. This fact is described in detail in the examples described hereinafter.

Therefore, considering productivity, the upper limit of ion exchange depth is preferably 400 $\mu$m, and more preferably 250 $\mu$m.

It is sufficient for the surface compression stress to be 2,000 $kg/cm^2$ or more. The upper upper limit of the surface compression stress is not particularly limited, but is generally determined from the standpoints of productivity, production cost and the like. For example, the surface compression stress obtained is basically determined by the amount of Li ion in glass composition, and also the proportion that Li ions in the vicinity of the surface are exchanged with Na ions.

On the other hand, the surface compression stress imparted is relaxed if the temperature of molten salt is high or the dipping time in the molten salt is long.

To this effect, the upper limit of the surface compression stress which can be imparted is about 3,000 $kg/cm^2$.

In the light of the above, the chemically tempered aluminosilicate single glass preferably has an Na ion exchange depth of 400 $\mu$m or less and a surface compression stress of 3,000 $kg/cm^2$ or less.

When a chemically tempered single glass sheet is used, the glass laminate for vehicles of the present invention can generally be produced by the following method.

An aluminosilicate glass sheet containing lithia ($Li_2O$) is provided. The glass sheet is dipped in a molten salt of sodium nitrate, where the sheet is chemically tempered by an ion exchange of Li ions with Na ions. The sheet thus chemically tempered is laminated with another optional single glass sheet through a PVB film interlayer to obtain a laminated glass, with the chemically tempered glass sheet being arranged at the outermost surface of the resulting laminated glass.

The following method will be considered as one modification example of the method for producing the laminated glass for vehicles of the present invention.

In a method for producing a laminated glass for vehicles by laminating at least two single glass sheets through at least one interlayer, the outermost single glass sheet of the laminated glass, which is an aminosilicate glass containing lithia ($Li_2O$), is subjected to bending processing, chemically tempered by an ion exchange of Li ions with Na ions, and then laminated with another single glass sheet that has also been subjected to bending processing, through an interlayer.

In this method, at least the single glass sheet to be the outermost layer of the resulting laminated glass is first bent, chemically tempered by ion exchange, and then laminated with another single glass sheet that has also been bent, through an interlayer. On the other hand, the conventional tempering-bending process simultaneously conducts bending processing and tempering step. Accordingly, the conventional technique is naturally limited with respect to the shape of the glass sheet to be molded and obtained..

As opposed to the conventional technique, the above method conducts a tempering step and a bending step separately. Therefore, the method has the characteristic that it is possible to produce chemically tempered laminated glass for vehicles having variously curved shapes which cannot be molded in conventional glass tempering techniques.

The present invention is described below in more detail by reference to the following examples, but it should be understood that the invention is not construed as being limited thereto.

[Aluminosilicate Glass Sheet]

An aluminosilicate glass sheet to be disposed at the outermost surface of a laminated glass laminate is explained.

An aluminosilicate glass sheet having the composition shown in Table 1 below was prepared in a float method. The thickness of the sheet was about 5 mm. Each component shown in Table 1 is % by weight.

TABLE 1

| | |
|---|---|
| $SiO_2$ | 63.0 |
| $Al_2O_3$ | 16.3 |
| $Li_2O$ | 3.7 |
| $Na_2O$ | 10.6 |
| $K_2O$ | 0.4 |
| MgO | 1.9 |
| CaO | 3.8 |
| $TiO_2$ | 0.02 |
| $Fe_2O_3$ | 0.08 |
| $SO_3$ | 0.2 |

A glass having the above composition has a melting temperature, a working temperature and a liquid-phase temperature as shown in Table 2 below, and is a glass composition capable of producing a glass sheet by a float method.

TABLE 2

| | |
|---|---|
| Melting temperature (° C.) | 1,522 |
| Working temperature TW (° C.) | 1,039 |
| Strain temperature (° C.) | 469 |
| Liquid-phase temperature TL (° C.) | 1,002 |
| Transition temperature Tg (° C.) | 512 |

The aluminosilicate glass sheet has a Vickers hardness (Hv) of 598 kg/mm². For comparison, the Vickers hardness of a soda-lime glass sheet is Hv=533 kg/mm². In other words, the surface hardness of the aluminosilicate glass sheet is relatively high. Therefore, it is believed that laminated glass samples comprising the aluminosilicate glass sheet gave good results in a stone impact test described hereinafter.

In addition, the aluminosilicate glass has a Young's modulus of about 8,500 kg/mm². For comparison, the Young's modulus of a soda-lime glass sheet is about 7,500 kg/mm². In other words, the Young's modulus of the aluminosilicate glass sheet is relatively high. Therefore, it is believed that laminated glass samples comprising the aluminosilicate glass sheet gave good results in the stone impact test.

(Stone Impact Test)

Samples of the aluminosilicate glass sheet each having an actual size of windows of railroad vehicles were prepared. For comparison, non-tempered samples and semi-tempered samples (generally having about 2-fold strength as compared with the non-tempered samples) of soda-lime silicate glass were also prepared.

Each of these samples was laminated with a non-tempered soda-lime silicate glass sheet (thickness: 2 mm) by a float method through an interlayer of PVB film, with the soda-lime silicate glass sheet facing inside, as shown in FIG. 1, thereby preparing samples of laminated glass for vehicles.

These laminated glass samples were subjected to a stone impact test, wherein, using an air gun, small stones weighing about 2 g were shot against the outside surface of each sample at 30 shooting sites, at a shooting speed of 90 km/hr and at a shooting angle to the sample surface of 0 degree (that is, the stones were shot vertically to the surface). This test is a simulation for the application of laminated glasses to front windshields of vehicles.

To evaluate the samples thus tested, "samples that had been scratched to have a scratch of more than 4 mm" and the number of "samples that had been broken" were considered to be exchanged for new ones in practical use, and the number thereof was counted.

TABLE 3

Stone Impact Test
Shooting angle to sample surface = 0 degree:

| Outside Glass | Soda-Lime Silicate | | Aluminosilicate |
|---|---|---|---|
| Tempering | Non-tempered | Tempered | Non-tempered |
| Size of scratch | | | |
| Less than 2 mm | 0/30 | 2/30 | 4/30 |
| 2 to 4 mm | 7/30 | 9/30 | 15/30 |
| More than 4 mm | 12/30 | 10/30 | 7/30 |
| Broken | 14/30 | 9/30 | 4/30 |
| Total Number of defective | 26/30 | 19/30 | 11/30 |

From the data shown in Table 3 above, where the samples that had been subjected to the stone impact test at a shooting angle of 0 degree were evaluated in accordance with the criteria above, the following will be concluded.

The total number of defectives of the laminated glass samples of aluminosilicate glass was smaller than that of defectives of the laminated glass samples of non-tempered and even tempered soda-lime silicate glass.

APPLICATION EXAMPLE

An aluminosilicate glass sheet prepared by a float method was cut into predetermined sizes of windshields of railroad vehicles or automobiles. The thus-cut sheet was laminated with a soda-lime silicate glass sheet prepared by a float method, through a PVB film to obtain a laminated glass for vehicles. In this case, the laminated glass may be either flat or bent, depending on the designs of the windows of railroad vehicles or automobiles, to which it is applied.

This application example is an example to apply the laminated glass of the present invention to windshields of railroad vehicles or automobiles. However, the present invention is not limited to this application example, and the laminated glass of the present invention is also applicable to side windows of vehicles.

Further, the above application example was that two single glass sheets were laminated through an interlayer to obtain the laminated glass for vehicles. However, the present invention is not limited to this embodiment, and three or more single glass sheets can be laminated through the respective interlayer depending on the site to which the glass laminates are applied and also the necessity thereof, to obtain a laminated glass, which is also fallen within the scope of the present invention.

[Chemically Tempered Glass Sheet]

A chemically tempered glass sheet to be disposed at the outermost surface of a laminated glass is described.

A glass sheet having a lithia-aluminosilicate composition shown in Table 4 was prepared by a float method. The thickness of the sheet was about 5 mm. The content of each component shown in Table 4 is % by weight.

TABLE 4

| | |
|---|---|
| $SiO_2$ | 63.0 |
| $Al_2O_3$ | 16.3 |
| $Li_2O$ | 3.7 |

TABLE 4-continued

| | |
|---|---|
| $Na_2O$ | 10.6 |
| $K_2O$ | 0.4 |
| MgO | 1.9 |
| CaO | 3.8 |
| $TiO_2$ | 0.02 |
| $Fe_2O_3$ | 0.08 |
| $SO_3$ | 0.2 |

The glass having the above composition has a melting temperature, a working temperature and a liquid-phase temperature as shown in Table 5, and is a glass composition capable of producing a glass sheet by a float method.

TABLE 5

| | |
|---|---|
| Melting temperature (° C.) | 1,522 |
| Working temperature TW (° C.) | 1,039 |
| Strain temperature (° C.) | 469 |
| Liquid-phase temperature TL (° C.) | 1,002 |
| Transition temperature Tg (° C.) | 512 |

The glass sheet was subjected to ion exchange treatment in the following manner.

Sodium nitrate was put into a stainless steel vessel, and heated up to about 500° C. The temperature was maintained for about 30 minutes to remove the impurities.

The lithia-aluminosilicate glass sheet was heated to about 400° C., and then dipped in the above sodium nitrate melt maintained at a predetermined temperature, thereby conducting an ion exchange treatment. The ion exchange treatment was conducted by diffusion exchange between $Li^+$ and $Na^+$.

After having been maintained in the melt for a predetermined treatment time, the glass sheet was taken out of the melt and then gradually cooled to room temperature. The glass sheet was fully washed with city water.

The sample thus prepared was subjected to XMA to measure the Na ion exchange depth. The measurement conditions were as follows.

| Measurement conditions: | |
|---|---|
| Apparatus used: | JXA8600 |
| Method: | Linear analysis |
| Accelerated voltage: | 15 kV |

Further, the surface compression stress of the sample was measured with a polarizing microscope. The sample was prepared as follows.

A sample glass was cut in the cross-sectional direction with a fine cutter, and a glass sheet obtained was polished to have a thickness of about 300 μm, thereby obtaining a sample for measurement. The amount of strain of the thus-prepared sample was measured using a Sénarmont compensator, and the value obtained was converted to the surface compression stress.

(Preliminary Experiment)

The lithia-aluminosilicate glass sheet prepared above was dipped in a melt of sodium nitrate to conduct ion exchange. The treatment temperature was 340° C., and the dipping time was 8 hours and 16 hours. Thus, two samples of different level were prepared. The results obtained are shown in Table 6 below.

TABLE 6

| Dipping Time (hr) | Na exchange depth (μm) | Surface compression stress (kg/cm²) | Stress layer thickness (μm) |
|---|---|---|---|
| 8 | 160 | 1,880 | 45 |
| 16 | 210 | 2,270 | 65 |

These samples were subjected to the stone impact test described hereinafter (see Table 9). As a result, significant difference was not observed in the number of defectives between the chemically tempered samples (ion exchange: 340° C.×8 hrs) and the non-tempered or tempered samples having soda-lime glass composition. Thus, the effect by the chemical tempering by ion exchange at 340° C. for 8 hours was not observed.

However, the number of defectives of the samples chemically tempered by ion exchange at 340° C. for 16 hours was smaller than that of defectives of the non-tempered or tempered samples having soda-lime glass composition. Thus, the effect by the chemical tempering by ion exchange at 340° C. for 16 hours was observed.

Those test data indicated that the chemically tempered single glass sheet having an Na ion exchange depth of 180 μm or more and a surface compression stress of 2,000 kg/cm² or more can effectively be used as a chemically tempered single glass sheet which constitutes a laminated glass for use as a countermeasure for flying stones.

In addition, using the above lithia-aluminosilicate glass sheet, samples were prepared under various ion exchange conditions. The treatment temperature was changed to 340–460° C. and the dipping time was changed to 8–96 hours.

(Investigation on Ion Exchange Condition)

The temperature of the molten salt for ion exchange was maintained constant at 380° C., and the dipping time was changed to 8–96 hours. The results obtained are shown in Table 7 below.

TABLE 7

| Dipping Time (hr) | Na exchange depth (μm) | Surface compression stress (kg/cm²) | Stress layer thickness (μm) |
|---|---|---|---|
| 8 | 200 | 2,600 | 80 |
| 16 | 210 | 2,610 | 100 |
| 24 | 300 | 2,926 | 105 |
| 40 | 310 | 2,714 | 115 |
| 64 | 380 | 2,935 | 130 |
| 96 | 420 | 2,674 | 110 |

It is seen from the data in Table 7 above that Na ion exchange depth increases as the dipping time becomes long where the molten salt temperature is constant.

However, if the dipping time is too long, the ion-exchange proceeds, and stress relaxation also proceeds. Therefore, the tendency in change of surface compression stress could not be found. Regarding the compression stress layer formed, the tendency was observed that its thickness increases with the increase in the dipping time.

Next, the dipping time was maintained constant to be 16 hours, and the molten salt temperature was changed to 340–460° C. The results obtained are shown in Table 8 below.

TABLE 8

| Molten salt temperature (° C.) | Na exchange depth (μm) | Surface compression stress (kg/cm²) | Stress layer thickness (μm) |
| --- | --- | --- | --- |
| 340 | 210 | 2,270 | 65 |
| 380 | 300 | 2,860 | 110 |
| 420 | 330 | 2,570 | 100 |
| 460 | 450 | 1,480 | 80 |

It is seen from the data in Table 8 above that Na ion exchange depth increases as the molten salt temperature becomes high where the dipping time is constant.

However, it is seen that if the molten salt temperature is too high, the ion exchange proceeds, and stress relaxation also proceeds, so that the surface compression stress decreases with 380° C. being peak. The same tendency was observed with respect to the thickness of the compression stress layer.

It is understood from the above that by subjecting lithia-aluminosilicate glass sheets to ion exchange treatment by selecting suitable dipping time and molten salt temperature, it becomes possible to produce chemically tempered glass sheets having an Na ion exchange depth of 180 μm or more and a surface compression stress of 2,000 kg/cm² or more.

One suitable condition for ion exchange is that the ion exchange is conducted at 380° C. for 16 hours.

(Stone Impact Test)

Chemically tempered lithia-aluminosilicate glass sheets each having an actual size of windows of railroad train were prepared in the same manner as above. For comparison, non-tempered samples and semi-tempered samples (generally having about 2-fold strength as compared with the non-tempered samples) of soda-lime silicate glass sheet were also prepared.

Each of those samples was laminated with a non-tempered, float soda-lime silicate glass sheet (thickness: 2 mm) through an interlayer of PVB, with the soda-lime silicate glass sheet facing inside, as shown in FIG. 1. Thus, various laminated glass samples for vehicles were prepared.

Those laminated glass samples were subjected to a stone impact test such that stones weighing about 2 g were shot using an air gun small against the outside surface of each sample at 30 shooting sites, at a shooting speed of 90 km/hr and at a shooting angle to the sample surface of 0 degree (that is, the stones were shot vertically to the surface). This test is a simulation for the application of the laminated glasses to front windshields of automobiles.

To evaluate the samples thus tested, the number of "samples that had been scratched to have a scratch of more than 4 mm" and the number of "samples that had been broken" were counted. Those sampless were considered necessary to be exchanged for new ones in practical use.

TABLE 9

Stone Impact Test
Shooting angle to sample surface = 0 degree:

| Outside Class Tempering | Soda-Lime Silicate | | Aluminosilicate | | |
| --- | --- | --- | --- | --- | --- |
| | Non-tempered | Tempered | 340° C. 8 hrs | 340° C. 16 hrs | 380° C. 8 hrs |
| Size of scratch | | | | | |
| Less than 2 mm | 0/30 | 2/30 | 1/30 | 4/30 | 0/30 |
| 2 to 4 mm | 7/30 | 9/30 | 15/30 | 11/30 | 18/30 |
| More than 4 mm | 12/30 | 10/30 | 13/30 | 7/30 | 3/30 |
| Broken | 14/30 | 9/30 | 11/30 | 8/30 | 9/30 |
| Total Number of defective | 26/30 | 19/30 | 24/30 | 15/30 | 12/30 |

The following can be said from the data shown in Table 9 above where the samples that had been subjected to the impact stone test at a shooting angle of 0 degree were evaluated in accordance with the criteria described above.

The total number of defectives of the laminated glass samples of lithia-containing aluminosilicate glass that had been chemically tempered by ion exchange at 340° C. for 16 hours or at 380° C. for 8 hours was smaller than that of defectives of the laminated glass samples of non-tempered, and even tempered soda-lime silicate glass.

Further, the laminate glass samples of non-tempered, or tempered soda-lime silicate glass, and the laminated glass samples of lithia-containing aluminosilicate glass that had been chemically tempered by ion exchange at 380° C. for 8 hours were subjected to another stone impact test at a shooting angle of 60 degrees. This test is a simulation for the application of the laminated glasses to side windows of automobiles. The samples tested were evaluated in the same manner as in the above test performed at a shooting angle of 0 degree.

TABLE 10

Shooting angle to sample surface = 60 degrees:

| Outside Glass | Soda-Lime Silicate | | Aluminosilicate |
| --- | --- | --- | --- |
| Tempering | Non-tempered | Tempered | 380° C. × 8 hours |
| Size of scratch | | | |
| Less than 2 mm | 4/30 | 11/30 | 8/30 |
| 2 to 4 mm | 18/30 | 15/30 | 21/30 |
| More than 4 mm | 8/30 | 3/30 | 1/30 |
| Broken | 0/30 | 1/30 | 0/30 |
| Total Number of defective | 8/30 | 4/30 | 1/30 |

The following can be said from the data shown in Table 7 where the samples that had been subjected to the impact stone test at a shooting angle of 60 degrees were evaluated in accordance with the criteria described above.

The laminated glass samples of lithia-aluminosilicate glass that had been chemically tempered by ion exchange at 380° C. for 8 hours were better than the laminated glass samples of tempered soda-lime silicate glass.

(Shattering Pattern)

Figure 2:
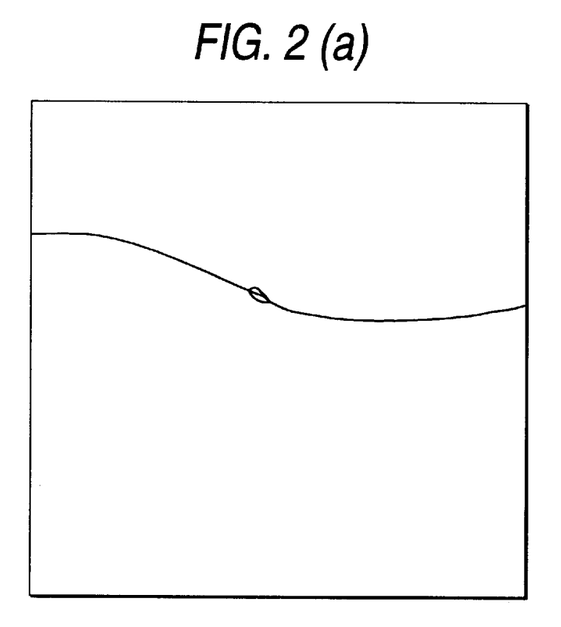

Respective one example of the shattering patterns of the chemically tempered lithia-aluminosilicate laminated glass and the non-tempered soda-lime silicate laminated glass by the stone impact test is shown in FIG. 2(a) and FIG. 2(b), respectively. Each sample tested has a size of 100 mm squares.

It is seen from such drawings that the chemically tempered laminated glass was broken into large pieces. In addition, it is seen therefrom that the chemically tempered laminated glass was broken into larger pieces than the non-tempered laminated glass. It is also seen that many of the non-tempered laminated glass was damaged to have large cracks at the site against which the small stones had directly smashed. Contrary to this, the chemically tempered laminated glass was not damaged to have such large cracks.

APPLICATION EXAMPLE

A lithia-aluminosilicate glass sheet that had been prepared by a float method and had been chemically tempered was cut into predetermined sizes of windshields of railroad vehicles or automobiles. The sheet thus cut was laminated with a soda-lime silicate glass sheet which had also been prepared by a float method, through a PVB film obtain a chemically tempered laminated glass for vehicles. In this case, the laminated glass may be either flat or bent, depending on the designs of the windows of automobiles or railroad vehicles to which it is applied.

This application example is an example as windshields of railroad vehicles or automobiles. However, the present invention is not limited to this application example, and the laminated glass of the invention is applicable to side windows of vehicles.

Further, in the above application example, two single glass sheets were laminated through the interlayer to obtain the laminated glass for vehicles. However, the present invention is not limited to such an application example, and three or more single glass sheets can be laminated with no difficulty to obtain laminated glasses, depending on the site to which the laminated glasses are applied and also the necessity, which are also fallen within the scope of the present invention.

REFERENTIAL COMPARATIVE EXAMPLE

An example is described below where a glass sheet of soda-lime silicate composition which is widely used as window glass sheets for vehicles and was obtained by a float method, was ion-exchanged.

A 5 mm thick glass sheet having a soda-lime silicate composition and produced by a float method was provided.

This glass sheet was dipped in a melt salt of potassium nitrate (temperature: 460° C.) to conduct ion exchange treatment. The dipping time was 4–64 hours. The ion exchange treatment was conducted by diffusion exchange between $Na^+$ and $K^+$.

TABLE 11

| Dipping Time (hr) | K exchange depth ($\mu$m) | Surface compression stress (kg/cm$^2$) | Stress layer thickness ($\mu$m) |
|---|---|---|---|
| 4 | 20 | 2,800 | 10 |
| 16 | 30 | 2,760 | 20 |
| 64 | 40 | 3,450 | 30 |

It is seen from the data shown in Table 11 above that where a glass sheet of soda-lime composition is ion exchanged by diffusion exchange between $Na^+$ and $K^+$, a glass sheet having the surface compression stress of larger than 2,700 kg/cm$^2$ can be obtained. However, the K ion exchange depth in the ion-exchanged samples was at most only 40 $\mu$m.

As described hereinabove, the present invention exhibits the following effects.

The single glass sheet disposed at the outermost surface has an aluminosilicate glass composition. Due to its inherent characteristics, the aluminosilicate glass sheet has a high surface hardness and also a high Young's modulus. Therefore, it is considered to be difficult for the glass sheet to be scratched.

Since the laminated glass of the present invention comprises the aluminosilicate single glass sheet as its outermost layer, it shall receive small internal stress even if damaged. Therefore, being different from conventional laminated glasses, the laminated glass of the present invention is not entirely broken, even if damaged. Where the laminated glass is used in the windows of vehicles and where it is slightly broken, the broken laminated glass does not give any serious fear to the passenger crew and even to the passengers. In addition, the broken laminated glass does not interfere with the visual field of the drivers and the passenger crew.

Where the aluminosilicate glass sheet is produced by a float method, the glass sheet does not require polishing. Therefore, large-sized plain stock glass sheets can be obtained at low cost. Further, the glass sheets by a float method are that their inner stress is well released. From this fact, there is the effect that they are cracked little with shock.

The aluminosilicate glass composition for the outermost glass sheet is specifically defined to have specific melting temperature and working temperature suitable for a float method. Therefore, such a specific aluminosilicate glass composition can well be applied to a float method.

In the preferred embodiment, the aluminosilicate glass composition containing lithia is chemically tempered by ion exchange between $Li^+$ and $Na^+$. The ion exchange can be completed within a short period of time. Further, it is possible to increase the ion exchange depth.

The lithia-containing aluminosilicate single glass sheet thus ion exchanged has an Na ion exchange depth of 180 $\mu$m or more and a surface compression stress of 2,000 kg/cm$^2$ or more.

While the invention has been described in detail and with reference to specific embodiments thereof, it will be apparent to one skilled in the art that various changes and modifications can be made therein without departing from the spirit and scope thereof.

What is claimed is:

1. A laminated glass for vehicles comprising at least two single glass sheets which are laminated through at least one interlayer, wherein an outermost single glass sheet in a laminate comprising at least two single glass sheets is an aluminosilicate glass containing lithia ($Li_2O$), wherein said aluminosilicate glass containing lithia comprises, in % by weight:

58 to 66% $SiO_2$;
13 to 19% $Al_2O_3$;
3 to 4.5% $Li_2O$;
6 to 13% $Na_2O$;
0 to 5% $K_2O$,
   with the proviso that $Li_2O+Na_2O+K_2O=10$ to 18%:
0 to 3.5% MgO;
1 to 7% CaO;
0 to 2% SrO;
0 to 2% BaO,
   with the proviso that MgO+CaO+SrO+BaO=2 to 10%:
0 to 2% $TiO_2$;
0 to 2% $CeO_2$;
0 to 2% $Fe_2O_3$; and 0 to 1% MnO, with the proviso that $TiO_2+CeO_2+Fe_2O_3+MnO=0.01$ to 3%.

2. The laminated glass for vehicles as claimed in claim 1, wherein said aluminosilicate glass containing lithia comprises, in % by weight:

60 to 66% $SiO_2$;
15 to 18% $Al_2O_3$;
3 to 4.5% $Li_2O$;
7.5 to 12.5% $Na_2O$;
0 to 2% $K_2O$, with the proviso that $Li_2O+Na_2O+K_2O=11$ to 17%;

0.5 to 3% MgO;
2.5 to 6% CaO;
0 to 2% SrO;
0 to 2% BaO;

with the proviso that $MgO+CaO+SrO+BaO=3$ to 9%;

0 to 2% $TiO_2$;
0 to 2% $CeO_2$;
0 to 2% $Fe_2O_3$; and
0 to 1% MnO, with the proviso that $TiO_2+CeO_2+Fe_2O_3+MnO=0.01$ to 3%.

3. The laminated glass for vehicles as claimed in claim 1 or 2, wherein a matrix glass composition of said outermost single glass sheet has a melting temperature (at which the composition has a viscosity of $10^2$ poises) of 1,550° C. or less, a working temperature (at which the composition has a viscosity of $10^4$ poises) of 1,100° C. or less, and a liquid-phase temperature lower than said working temperature.

4. The laminated glass for vehicles as claimed in claim 1 or 2, wherein a matrix glass composition of said outermost single glass sheet has a melting temperature (at which the composition has a viscosity of $10^2$ poises) of 1,540° C. or less, a working temperature (at which the composition has a viscosity of $10^4$ poises) of 1,055° C. or less, and a liquid-phase temperature lower than said working temperature.

5. The laminated glass for vehicles as claimed in claim 1, wherein said outermost single glass sheet is a glass sheet obtained by a float method.

6. The laminated glass for vehicles as claimed in claim 1, wherein said outermost single glass sheet is chemically tempered by an ion exchange of Li ions with Na ions.

7. The laminated glass for vehicles as claimed in claim 6, wherein said outermost single glass sheet chemically tempered has a sodium ion exchange depth of 180 μm or more, and a surface compression stress of 2,000 kg/cm² or more.

8. The laminated glass for vehicles as claimed in claim 7, wherein said outermost single glass sheet chemically tempered has a sodium ion exchange depth of 400 μm or less, and a surface compression stress of 3,000 kg/cm² or less.

* * * * *